(12) United States Patent
Yurjevich

(10) Patent No.: US 6,546,791 B2
(45) Date of Patent: Apr. 15, 2003

(54) INDOOR HYDROPLANING TEST APPARATUS AND METHOD

(75) Inventor: Martin A. Yurjevich, Canton, OH (US)

(73) Assignee: Bridgestone/Firestone North American Tire, LLC, Nashville, TN (US)

( * ) Notice: Subject to any disclaimer, the term of this patent is extended or adjusted under 35 U.S.C. 154(b) by 0 days.

(21) Appl. No.: 09/924,837

(22) Filed: Aug. 8, 2001

(65) Prior Publication Data

US 2003/0029235 A1 Feb. 13, 2003

(51) Int. Cl.⁷ .............................................. G01M 17/02
(52) U.S. Cl. .................. 73/146; 340/438; 73/8
(58) Field of Search .................. 73/146, 146.2, 73/146.3, 146.4, 146.5, 146.8, 8; 340/458; 364/424.01; 280/762

(56) References Cited

U.S. PATENT DOCUMENTS

| 4,095,464 A | 6/1978 | Breedijk |
| 4,593,557 A | 6/1986 | Oblizajek et al. |
| 5,174,151 A | 12/1992 | Adachi et al. |
| 5,273,315 A | * 12/1993 | Debus ......................... 280/160 |
| 5,347,588 A | 9/1994 | Wilson |
| 5,424,714 A | * 6/1995 | Kin et al. ..................... 180/170 |
| 5,481,455 A | * 1/1996 | Iwata et al. .................. 180/197 |
| 5,502,433 A | * 3/1996 | Breuer et al. ................ 152/210 |
| 5,532,678 A | * 7/1996 | Kin et al. ..................... 180/197 |
| 5,562,787 A | * 10/1996 | Koch et al. ............... 152/152.1 |
| 5,723,768 A | 3/1998 | Ammon |
| 5,777,731 A | 7/1998 | McBride |

* cited by examiner

Primary Examiner—Hezron Williams
Assistant Examiner—Andre Allen
(74) Attorney, Agent, or Firm—John M. Vasuta; Michael Sand

(57) ABSTRACT

Method and apparatus for conducting indoor hydroplaning tests on a tire. A tire is supported by a frame above a test surface and a load is applied to the tire tread against the test surface. A stream of high pressure fluid is discharged from a nozzle against an area of contact of the tire tread and the test surface. A device detects a change in the loaded contact of the tire as the pressure of the fluid stream increases which provides an indication that hydroplaning is beginning to occur in comparison with a previously tested tire under actual driving conditions.

19 Claims, 6 Drawing Sheets

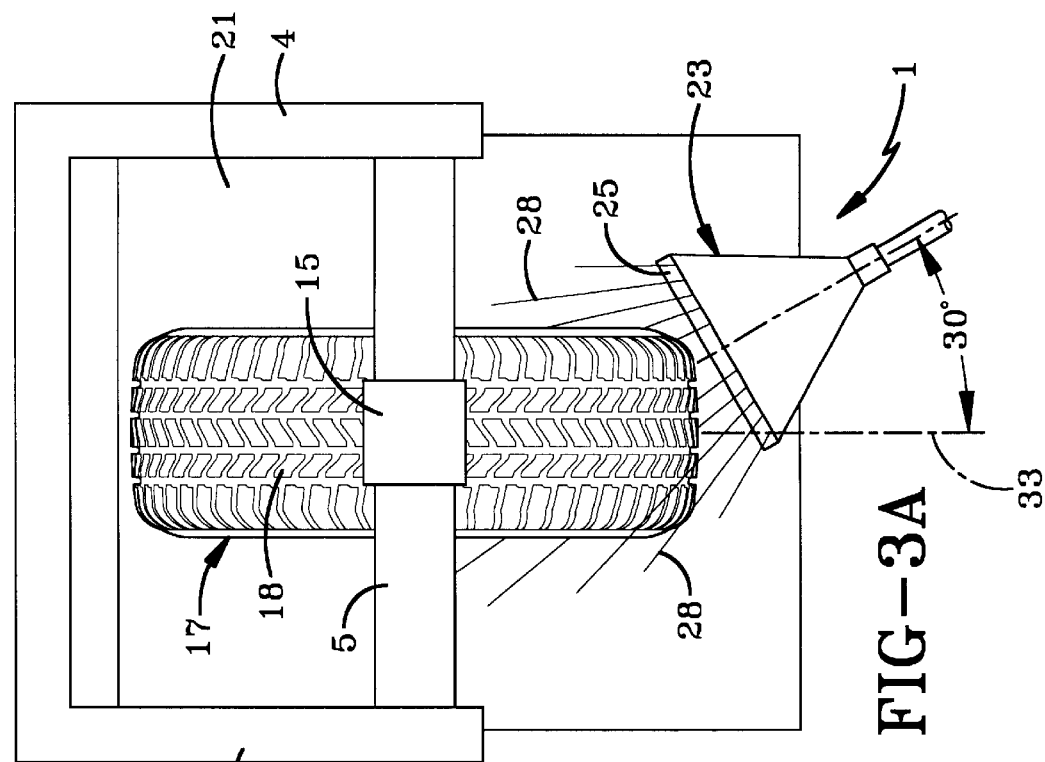
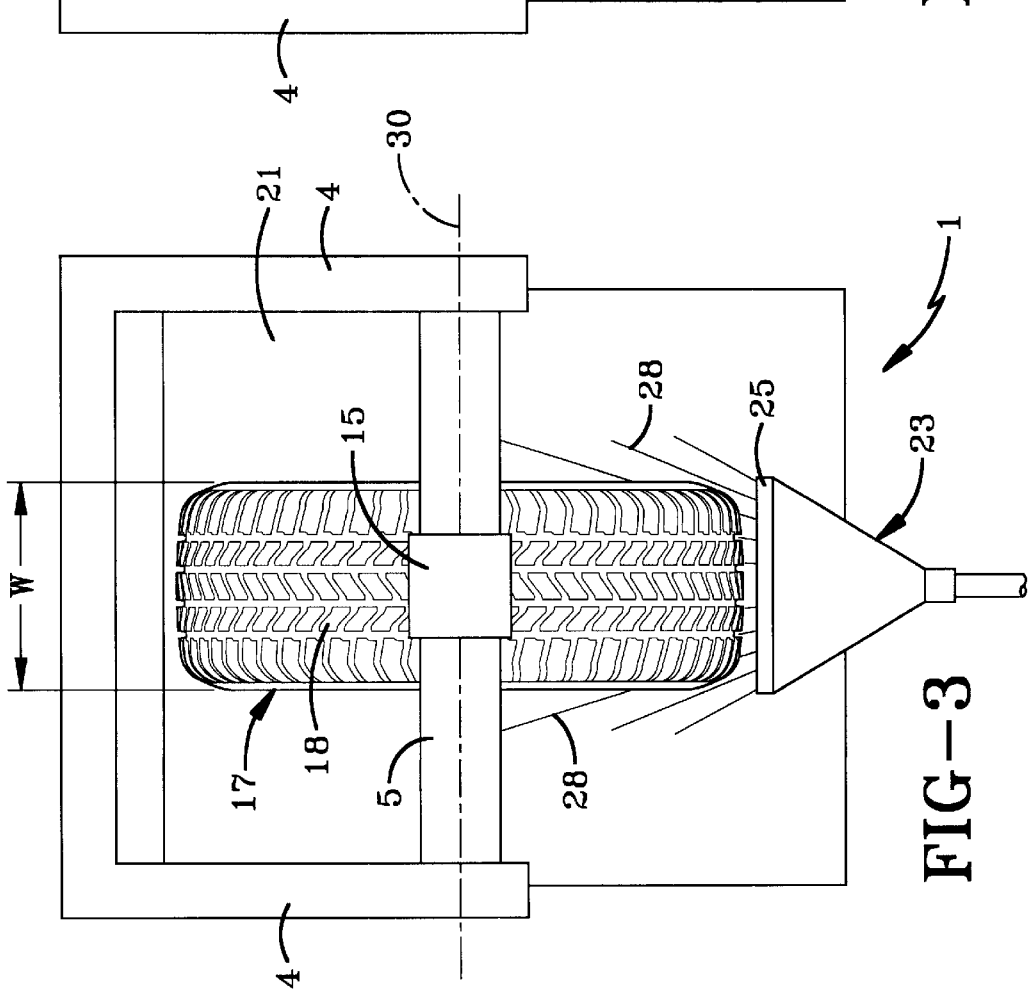

INDOOR HYDROPLANING TEST APPARATUS AND METHOD

BACKGROUND OF THE INVENTION

1. Technical Field

The present invention relates to vehicle tires and particularly to a method and apparatus for determining the start of hydroplaning of the tire due to the increased volume of water and pressure between the tire and road surface.

2. Background Information

When a vehicle tire travels along a wet road, a film of water is formed between the tire and road surface at the area of contact or at the footprint of the tire. This can result in a hydroplaning effect on the vehicle or tire when the tread pattern of the tire is insufficient to disperse the amount of water accumulating between the tire and road surface. This hydroplaning effect on a vehicle is one of the many factors tire manufacturers consider when designing tires and in particular, the tread pattern thereof, which is designed to disperse as much water as possible while providing the other features to the tire such as wear, cornering, braking, etc.

Various tests have been designed to determine the hydroplaning effect on a particular tire tread pattern and to quantify the tire performance. Heretofore, most of these tests were performed on outdoor test tracks with an actual production tire. Such testing is expensive and time consuming. In order to avoid these expensive outdoor tire test procedures, various indoor tire test equipment has been developed such as shown in U.S. Pat. Nos. 4,095,464, 4,593,557, 5,174,151, 5,347,588, and 5,723,768. All of these indoor test apparatus have various mechanisms for placing a load on the tire and for viewing the footprint of the tire at the contact patch or area with the road surface and disclose methods for analyzing the data to ascertain the effectiveness of the particular tire tread pattern being tested for various driving factors including hydroplaning. U.S. Pat. No. 5,723,768 uses a wedge of water beneath the tire and by measuring the natural vibration of the tire is able to evaluate the possibility of the effect of water on the hydroplaning of the tire.

SUMMARY OF THE INVENTION

The present invention provides a relatively simple and inexpensive test apparatus and method for determining the susceptability of a particular tire tread pattern to hydroplaning. The test apparatus of the present invention includes a frame that supports the tire wheel assembly above a simulated road surface or test surface and supplies a load of desired amount to the axle/spindle of the tire wheel assembly.

The spindle of the test apparatus of the present invention can be allowed to rotate freely or be fixed in place and a fluid such as water, is applied at high pressure through a nozzle against the leading portion of the tire at the area of contact with the test surface. Measurements are taken of the load applied on the tire and the amount of water applied thereto until the tire begins to spin or lifts off the test surface. This data provides an indication of the start of hydroplaning.

Another aspect of the invention enables the test apparatus and method to compare the collected data of the load applied to a tire and the amount of fluid pressure from the injection nozzle required to begin lifting the tire off the road contact surface or start of tire rotation against results of a standard tire tested under actual road conditions to provide a comparison therebetween.

Another feature of the invention is the ability to control the environment in which the tire is being tested such as the ambient temperature, surface conditions, and tire pressure. Also, various forces such as camber can be placed on the tire.

Still another feature of the invention is the ability to test quickly many designs, control test conditions, vary load, vary inflation pressure, run repeated tests without encountering unsatisfactory environmental test conditions such as wind, evaporation, and vehicle speed as experienced in an outdoor tire test environment.

Another aspect of the invention is the ability to use high speed video equipment, cameras, etc. for recording the tire footprint contact by providing a transparent test surface as the pressurized water is being applied thereto and increased to an amount of inducing full hydroplaning for further analyzing the effect of the water and dispersion pattern thereof through the tire tread pattern.

Still another advantage of the invention is the use of a nozzle having a width wider than the actual width of the test tire tread which is capable of delivering a sufficient volume of water under sufficient pressure to create a hydroplaning condition, and directing the stream of high pressure water at various angles on the tire tread to analyze the effect of the water dispersion pattern, the possibility of lateral hydroplaning, and the effect of the water on the tire during cornering or other driving conditions.

The foregoing advantages, construction, and operation of the present invention will become readily apparent from the following description and accompanying drawings.

BRIEF DESCRIPTION OF THE DRAWINGS

FIG. 3 is a top plan view of FIGS. 1 and 2;

FIGS. 3A, 3B and 3C are top plan views showing the spray nozzle at different angular positions with respect to the tire travel path;

Similar numerals refer to similar parts throughout the drawings.

DESCRIPTION OF THE PREFERRED EMBODIMENTS

Figure 1:
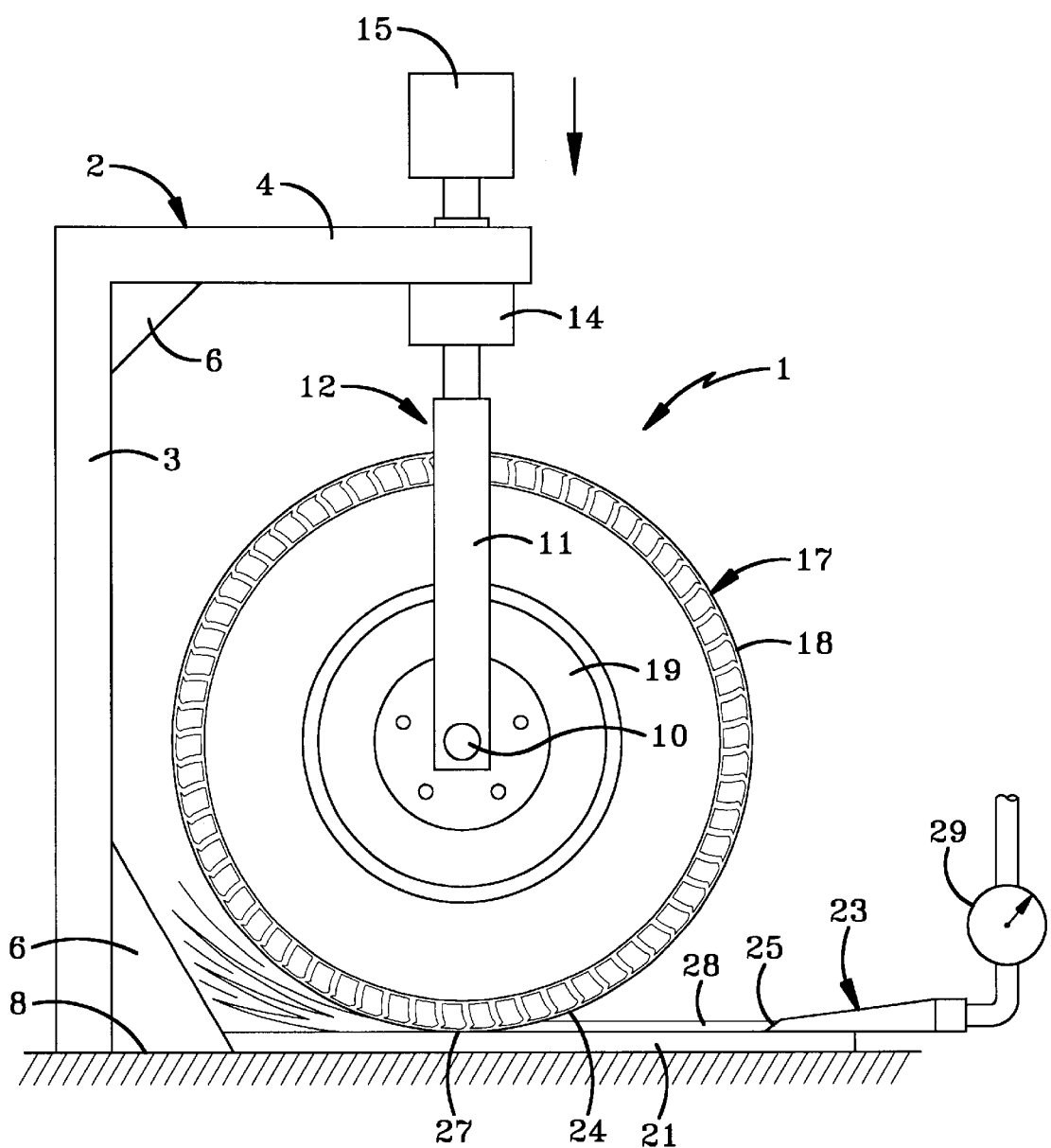
FIG. 1 is a diagrammatic side elevational view of the improved indoor hydroplaning test apparatus.

A first embodiment of embodiment of the improved tire test apparatus is indicated generally at 1 and is shown in FIG. 1. Apparatus 1 includes a support frame indicated generally at 2, which consists of a pair of vertical frame members 3 and a pair of outwardly projecting horizontal members 4 and a spindle support brace 5 extending therebetween. A plurality of reinforcing plates 6 extend between the various frame members and the floor or mounting surface 8 to provide stability to the test apparatus. A tire supporting spindle 10 extends between a pair of leg members 11 of a U-shaped frame indicated generally at 12. Frame 12 extends downwardly from frame member 5 and includes a load cell 14 and a load applying mechanism 15. A usual tire 17 having a test tread pattern 18 formed thereon, is mounted by a usual rim 19 on spindle 10. Load mechanism 15 applies a predetermined loading on tire 17 pressing tread 18 against a test surface 21. The test surface 21 can be made of smooth steel or coated with a safety coating or other surface texture to represent outdoor surfaces such as asphalt or concrete. The amount of load applied by mechanism 15 is detected and measured by load cell 14.

Figure 2:
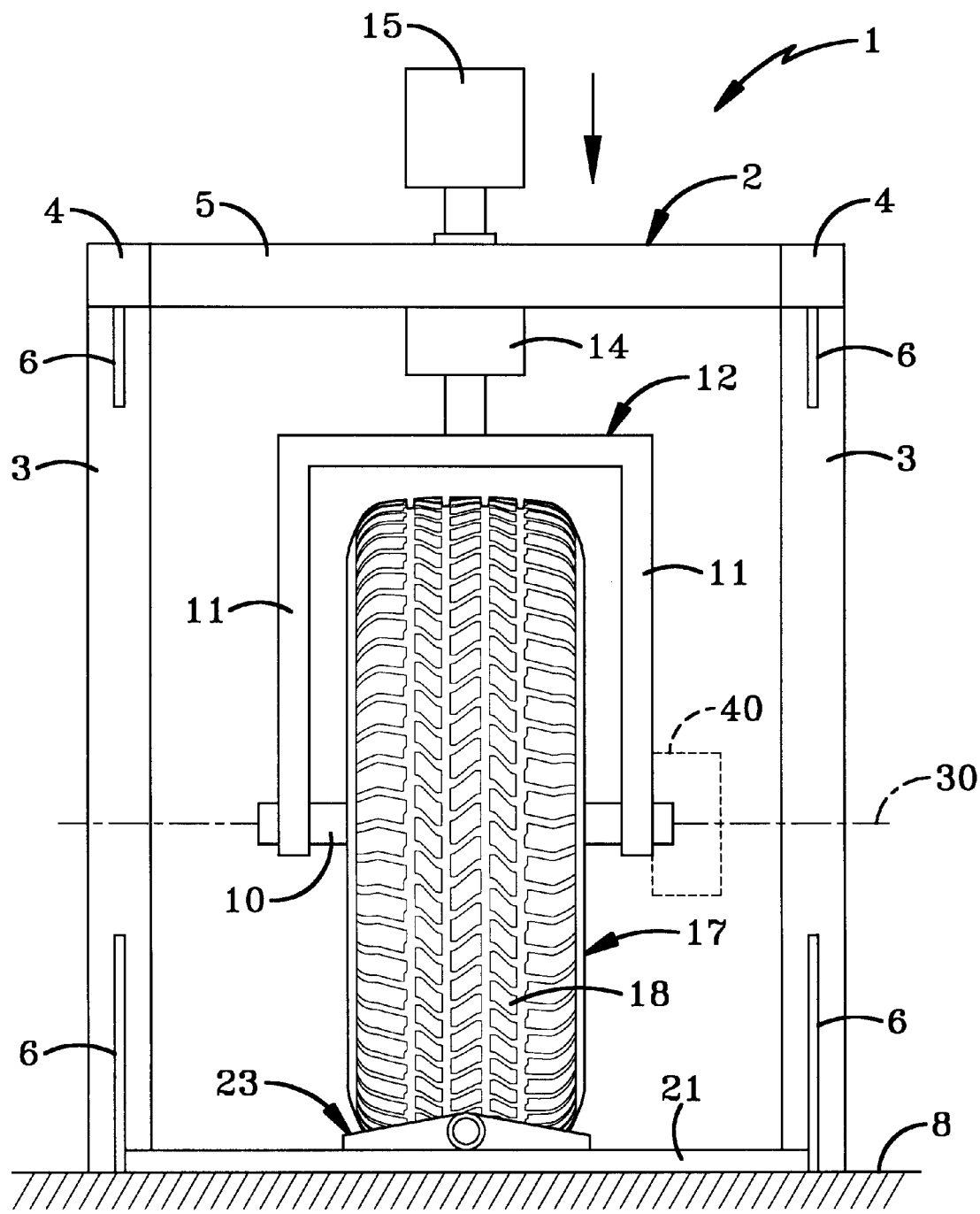
FIG. 2 is a front elevational view of the test apparatus of FIG. 1.

In accordance with one of the features of the invention, a nozzle indicated generally at 23, is placed in front of the leading edge 24 of tire tread 18. Nozzle 23 includes an elongated opening 25 which has a width greater than the axial width W (FIG. 3) of tire tread 18. A nozzle opening 25 approximately 10% greater than the axial width of tread 18 has been found to achieve the desired spray pattern of fluid at the interface or area of contact 27 between the tire tread and the test surface. A high pressure stream of fluid 28 which will usually be water, is applied by nozzle 23 at the area of contact 27 between leading edge 24 and the test surface. A gauge 29 at nozzle 23 will indicate and record the fluid pressure or volume as the fluid is discharged from the nozzle. Stream 28 will usually be in a horizontal direction along the top of test surface 21 to simulate the film of water that collects on a road surface. As shown in FIGS. 1–3, nozzle 23 is positioned so that the stream of water 28 is applied substantially perpendicular against the axis of rotation 30 of the tire on spindle 10 (FIGS. 2 and 3). Pressure gauge 29 and load cell 14 form a measurement system which provides data for determining the onset of hydroplaning, which data then is compared to that obtained from a field tested comparison tire.

In carrying out the method of the present invention, tire 17 is mounted on spindle 10 which can either be fixed against rotation or freely rotatably mounted on frame 12. Load applying mechanism 15 applies a predetermined load between the tire tread and test surface 21 which is measured and recorded by load cell 14. High pressure water 28 is then ejected from nozzle 23 against the leading edge of tread 18 at the area of contact 27 with road surface 21. The amount of fluid pressure (effective volume of water) is recorded and is steadily increased until load cell 14 determines that the tread is beginning to lift off of or significantly loses contact with test surface 21 which signals that hydroplaning would begin to occur under actual driving conditions. When tire 17 is freely rotatably mounted on spindle 10, the water pressure or volume at which the tire begins to rotate signals the pressure level or volume that hydroplaning is beginning to occur. Thus, by measuring the pressure of the fluid applied against the tire/road interface and the amount of load applied on the tire in relationship to the start of rotation of tire 17 or its overcoming the applied load thereto and starting to lift off test surface 21, provides the indication that hydroplaning is starting to occur. This data can then be compared against a comparison test tire which has been thoroughly tested on an outside test track under actual driving conditions and the data recorded to provide an easy and rapid comparison therebetween.

Thus, the method and apparatus of the present invention enables a test tire to be placed on apparatus 1 and loaded to any desire load. This load can be related to the weight of the particular vehicle on which the tire is intended to be used. The tire is then subjected to an increase in fluid pressure which will provide an increase in fluid volume, which signals when hydroplaning begins to occur. This test data then can be compared against that of an actual previously field tested tire to determine if the tire performs satisfactory or if the tread pattern has to be varied to provide better dispersion of fluid therefrom to prevent hydroplaning. This can be done in a relatively short period of time and under controlled conditions as opposed to mounting the tires on an actual vehicle driven around a test track by a skilled test driver with more complicated data acquiring equipment being required.

Figure 3C:
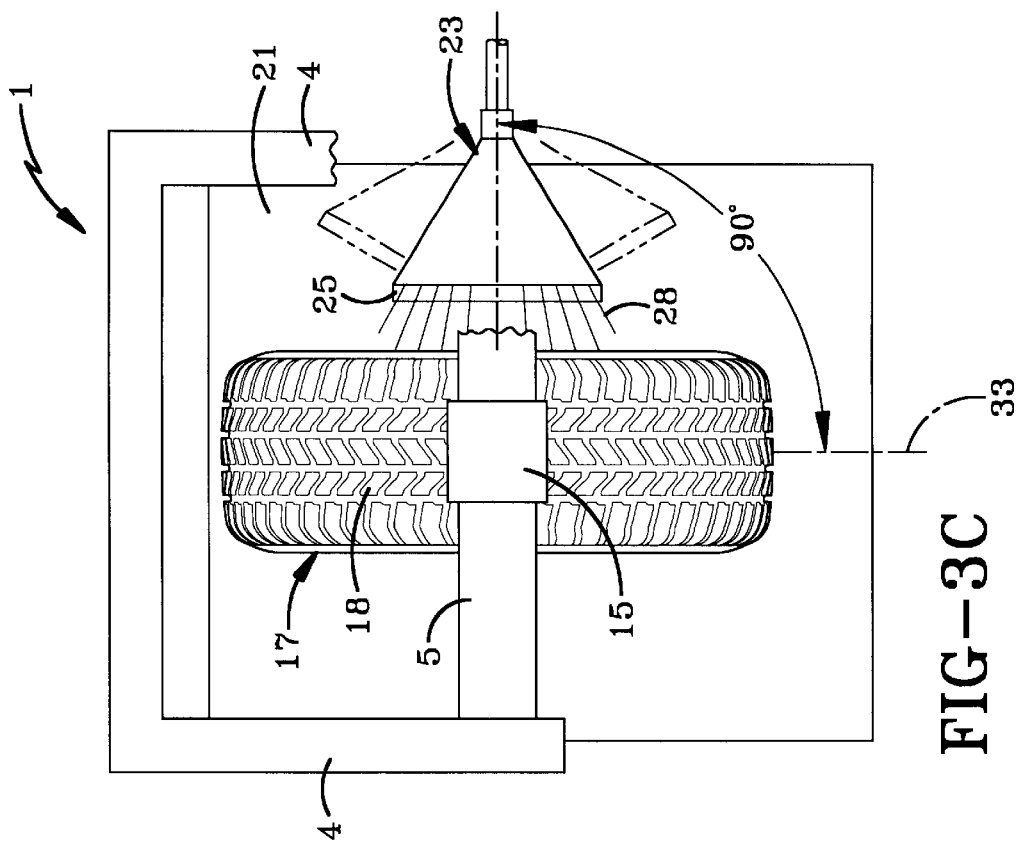
Figure 3B:
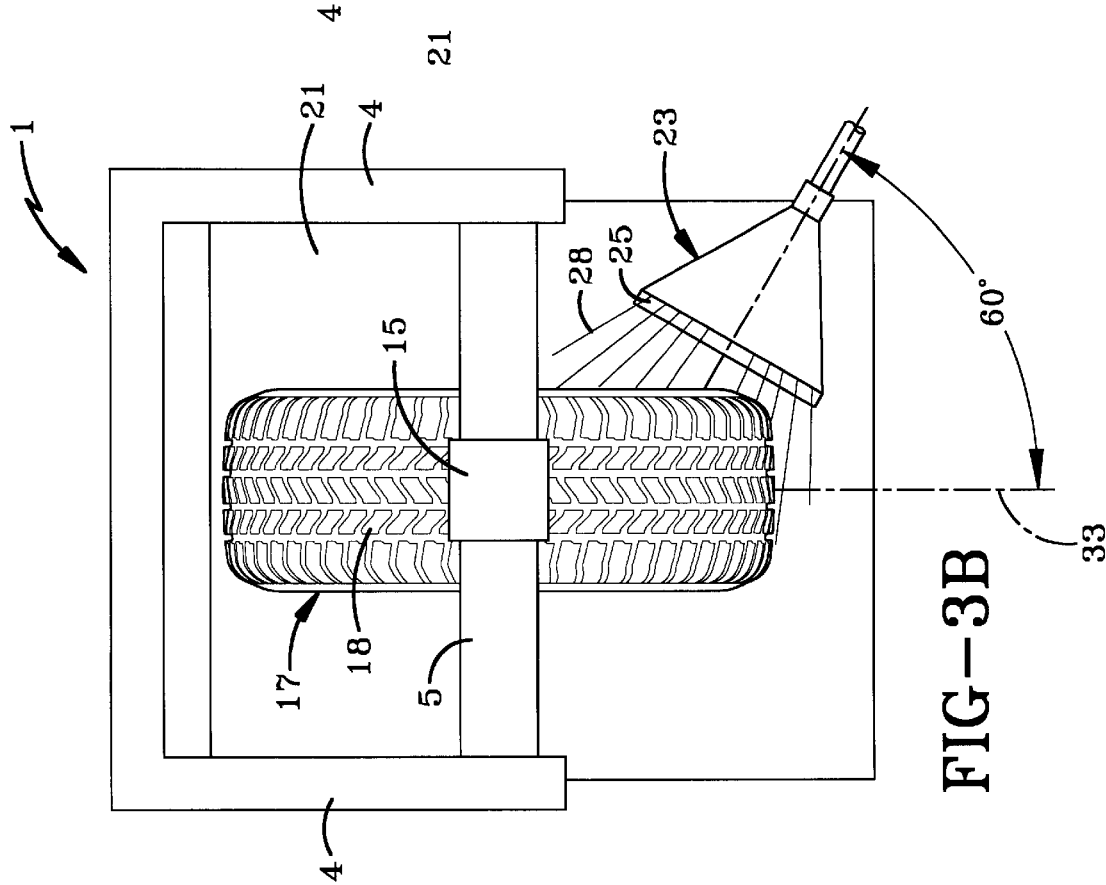

FIGS. 3A, 3B, and 3C show that nozzle 23 can apply fluid stream 28 at various angles against the tread or tire to simulate other types of driving conditions such as could occur during cornering or other driving maneuvers. FIG. 3A shows the nozzle directing the stream of fluid at an angle of approximately 30° with respect to the mid-circumferential plane 33 of the tire or 60° with respect to the axis of rotation 30. FIG. 3B shows fluid stream 28 being directed against the tire and tread pattern at a 60° angle with respect to mid-circumferential plane 33. FIG. 3C shows fluid stream 28 being directed perpendicular to mid-circumferential plane 33 or parallel with the axis of rotation 30 and at various angles thereto to determine the lateral hydroplaning characteristics of tire 17.

Figure 4:
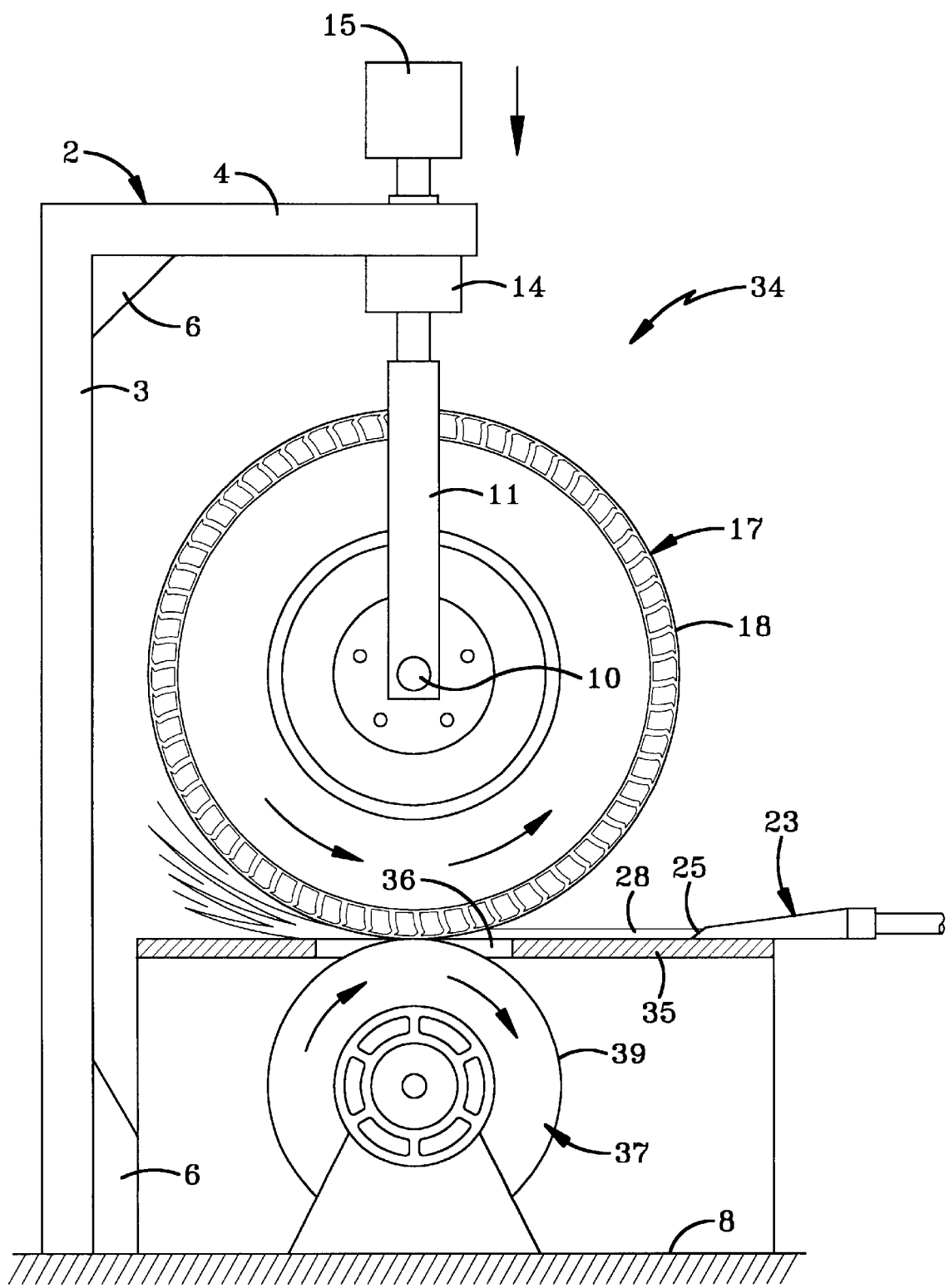
FIG. 4 is a side elevational view of a second embodiment of the hydroplaning test apparatus.

Another embodiment of the improved test apparatus and method is shown in FIG. 4 and is indicated generally at 34. Embodiment 34 includes a test surface 35 formed with an opening 36 at the area of contact with tire 17. A power driven drum 37 is mounted beneath opening 36 and engages tire tread 18 to provide a positive rotation thereto. Thus, the outer surface 39 of drum 37 becomes the road engaging surface which provides the area of contact against which fluid stream 28 is directed. Again, load cell 14 will detect when the tire lessens its loaded force against surface 39 to indicate the start of hydroplaning. A somewhat similar result can be achieved by positively driving spindle 10 by a drive mechanism 40 which could be attached directly to the spindle as shown in dot-dash lines FIG. 2. This provides for a positive rotation of the tire against the test surface to provide additional hydroplaning tests therefore.

Figure 5:
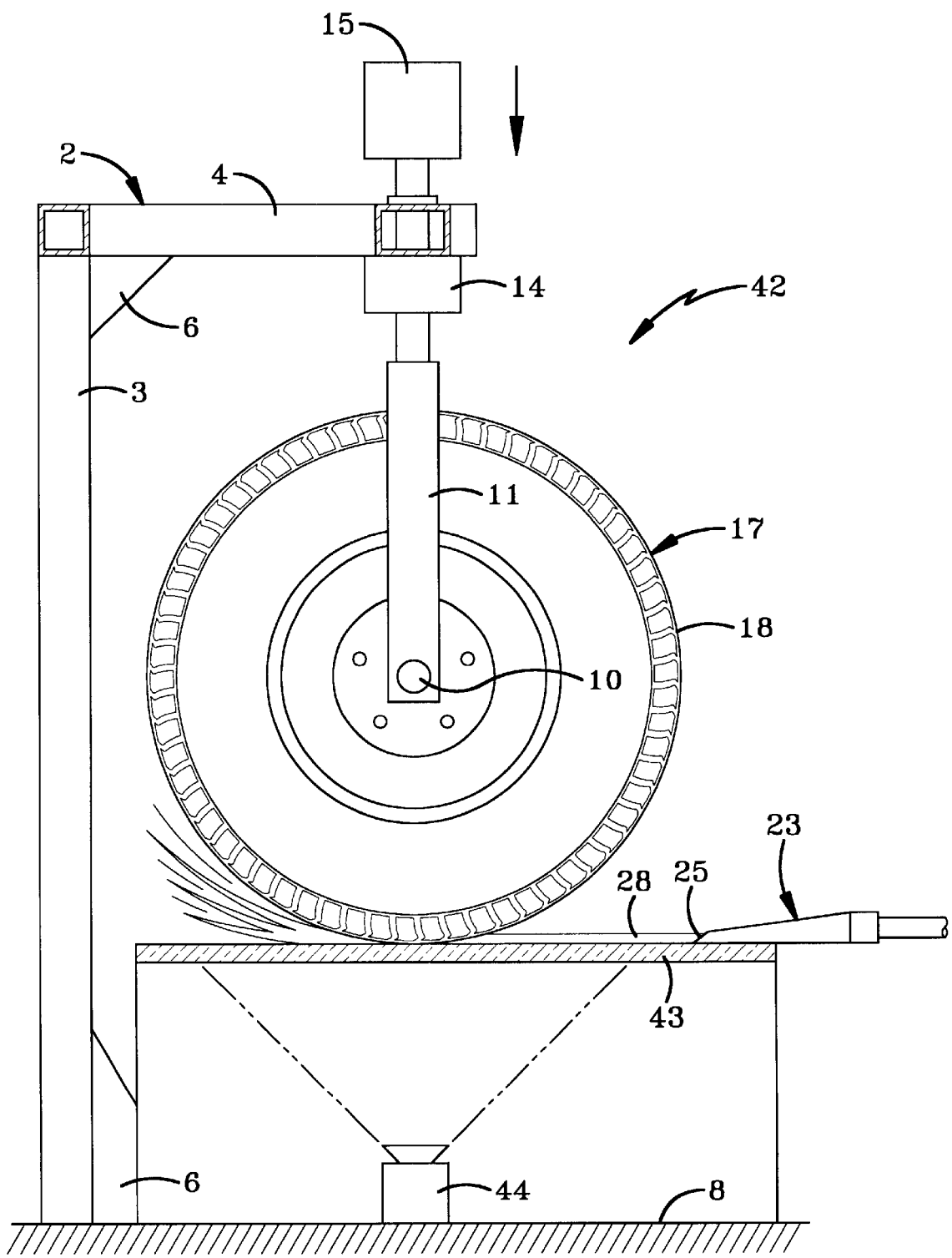
FIG. 5 is a side elevational view of a further embodiment of the hydroplaning test apparatus.

Another embodiment of the improved test apparatus and method is indicated generally at 42, and is shown in FIG. 5. Embodiment 42 includes a transparent test surface 43 which enables high speed imaging equipment 44 such as a camera or tv monitor to be placed beneath transparent surface 43. This provides a visual indication of the tread footprint with surface 43 and visually shows the dispersion pattern of the water being moved through the various grooves of the tire tread. It also will show the reduction in contact area between the tire tread and test surface as the pressure of water stream 28 is increased indicating the start of hydroplaning. Again, tire 17 can be fixed or rotatably mounted on spindle 10.

Thus, the improved test apparatus and method of the invention provides loading a tire/wheel assembly against a fixed plate or moveable simulated road surface, and directing water under high pressure at the leading edge of the tire at various angles, and recording the change in load on the tire as the water pressure or volume increases. This change in load which is related to the water pressure or volume provides an indication of when hydroplaning begins to occur which can be compared against a comparison test tire avoiding the heretofore required expensive and time consuming outdoor tests.

While the embodiments of the invention have been described, the invention is not limited thereto. The claims of the invention follow.

What is claimed is:

1. Apparatus for conducting indoor hydroplaning tests on a tire tread comprising:

a test surface;

a support for mounting a tire for loaded contact between a tread of the tire and the test surface;

a fluid nozzle for supplying a stream of high pressure fluid toward an area of contact between the tire tread and test surface, said fluid nozzle being formed with a discharge opening having a width greater than the axial width of the tire tread;

a pressure control for measuredly increasing the pressure of the stream of high pressure fluid; and a load cell for detecting a change in the loaded contact between the tire and test surface to indicate the onset of hydroplaning.

2. The apparatus defined in claim 1 wherein the nozzle opening extends perpendicular to an axis of rotation of the tire.

3. The apparatus defined in claim 1 wherein the nozzle opening extends parallel to an axis of rotation of the tire.

4. The apparatus defined in claim 1 wherein the nozzle opening extends at an acute angle to an axis of rotation of the tire.

5. The apparatus defined in claim 1 wherein the tire support includes an upstanding frame and a spindle for rotatably mounting the tire above the test surface.

6. The apparatus defined in claim 5 including a drive mechanism for rotating the spindle and tire mounted thereon.

7. The apparatus defined in claim 5, including a drive mechanism operatively connected to the spindle for rotating said spindle and a tire mounted thereon.

8. The apparatus defined in claim 1 wherein the measuring system includes a load cell for detecting a change in the loaded contact between the tire and test surface and a pressure gauge for measuring the pressure of the stream of high pressure fluid.

9. The apparatus defined in claim 1 wherein the test surface is a flat surface having a transparent area at least at the area of contact with the tire tread; and in which high speed imaging equipment observes changes in the tire tread footprint at said area of contact as the high pressure fluid is applied to said area of contact.

10. The apparatus defined in claim 1 wherein the test surface is a flat surface having an opening formed therein adjacent the test tire; and in which a drive drum is mounted adjacent said opening and engages the test tire to rotate said tire as the high pressure fluid is being applied thereto.

11. A method for determining the susceptibility of a vehicle tire to hydroplaning comprising the steps of:

providing a test surface;

mounting a test tire adjacent to and in loaded contact with the test surface;

directing a stream of high pressure fluid toward an area of contact between the tire and test surface;

increasing the pressure of the fluid; and measuring a change in contact pressure between the tire and test surface in relationship to the pressure of the fluid to determine the hydroplaning effect of the fluid on the tire.

12. The method defined in claim 11 including the step of comparing the change in contact pressure between the tire and test surface in relationship to the increase in fluid pressure with a predetermined change of a comparison tire.

13. The method defined in claim 11 including the step of providing a fluid nozzle having a nozzle width greater than the axial width of the tire.

14. The method defined in claim 11 including the step of providing the test surface with a transparent area at the area of contact with the tire tread; and providing high speed imaging equipment adjacent said transparent area for observing changes in the tread footprint.

15. The method defined in claim 11 including rotating the test tire against the test surface.

16. The method defined in claim 15 including the step of engaging the test tire with a power driven drum to rotate said tire.

17. The method defined in claim 11 including the step of directing the stream of high pressure fluid against the tire at the area of contact of the tire at an acute angle with respect to an axis of rotation of the tire.

18. The method defined in claim 11 including the step of directing the stream of high pressure fluid against the area of contact of the tire in a direction perpendicular to an axis of rotation of the tire.

19. The method defined in claim 11 including the step of directing the stream of high pressure fluid against the tire tread at the area of contact generally parallel to an axis of rotation of the tire.

* * * * *